United States Patent [19]

Plante

[11] Patent Number: 4,512,591
[45] Date of Patent: Apr. 23, 1985

[54] HAND TRUCK

[76] Inventor: Jean-Paul Plante, Rang 11 St Ephrem, Co. Beauce Quebec, Canada

[21] Appl. No.: 395,296

[22] Filed: Jul. 6, 1982

[51] Int. Cl.³ .............................................. B62B 3/02
[52] U.S. Cl. ................................ 280/47.35; 108/109; 108/111; 211/186; 211/189; 280/79.1 A
[58] Field of Search .............. 280/47.18, 47.34, 47.35, 280/79.1 R, 79.1 A, 79.3; 211/186, 187, 189; 108/56.1, 111, 108, 109; 312/257 SK, 257 A, 350

[56] References Cited

U.S. PATENT DOCUMENTS

| | | | |
|---|---|---|---|
| 1,582,045 | 4/1926 | Howe | 280/79.1 |
| 2,712,452 | 7/1955 | Hollowell | 280/79.1 |
| 3,537,408 | 11/1970 | Bartlett | 108/111 |
| 3,705,731 | 12/1972 | Berchack | 280/79.1 A |
| 4,122,781 | 10/1978 | Potter | 108/111 |

Primary Examiner—Joseph F. Peters, Jr.
Assistant Examiner—Joseph G. McCarthy
Attorney, Agent, or Firm—Murray Schaffer

[57] ABSTRACT

The disclosure herein describes a hand truck which comprises a base frame defined by side members and front and rear end members and into which may be compactly stored various components mountable to the base frame such as a handle, four uprights, a pair of bed plates and support elements for the bed plates; the base frame is equipped in one case, with supporting mounts for inclining two uprights relative to the base frame and, in another case, of an opening at each corner for mounting the four uprights to which are attached the support elements cooperating with the bed plates to form platforms which may be formed at various heights relative to the base frame.

9 Claims, 6 Drawing Figures

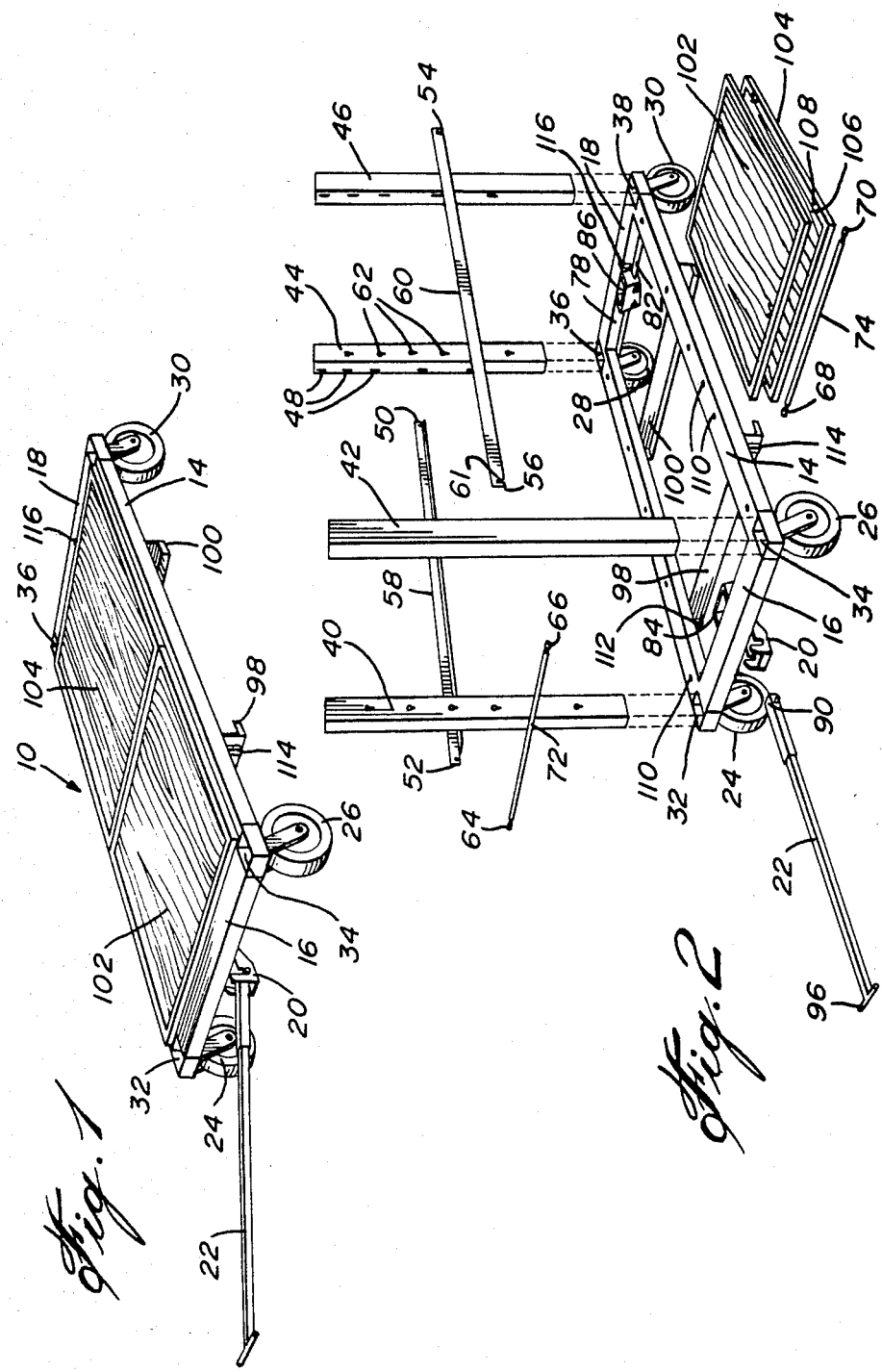

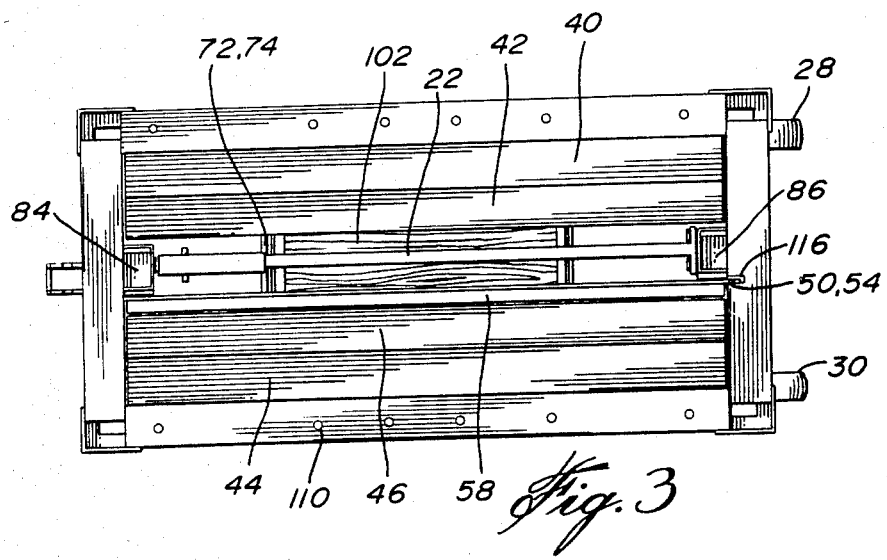
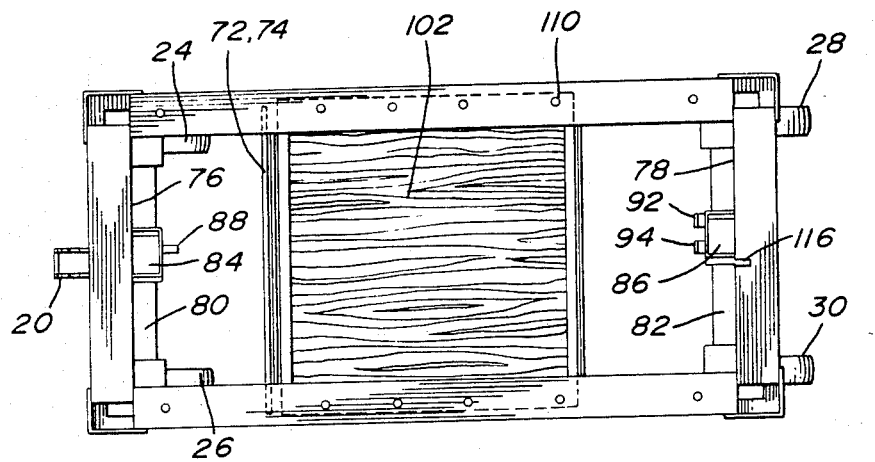

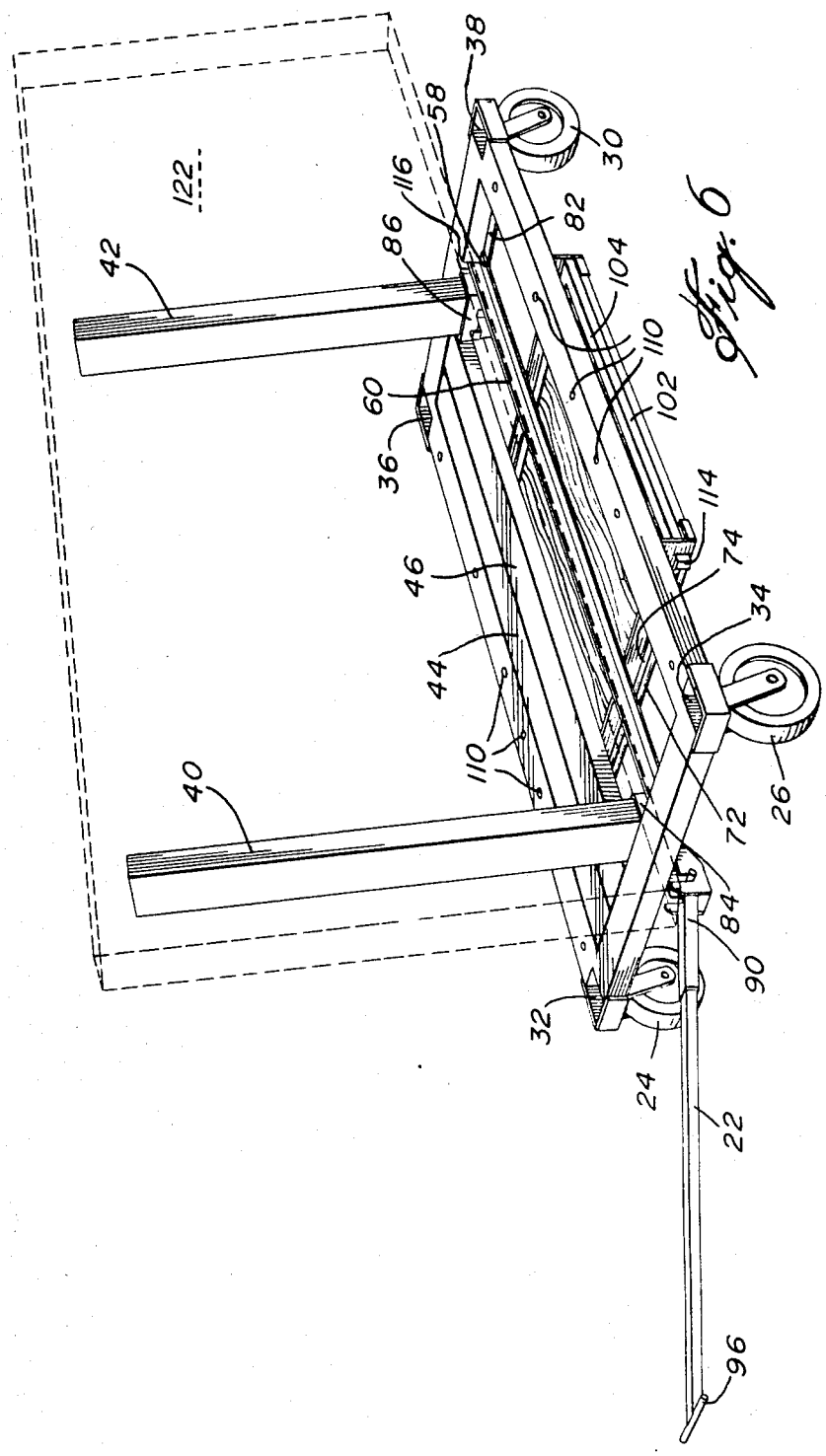

HAND TRUCK

FIELD OF THE INVENTION

The present invention relates to hand trucks and, more particularly, to trucks of the dolly type provided with means for compactingly storing dismountable components of the truck.

BACKGROUND OF THE INVENTION

Various hand trucks exist for moving articles from place to place. They perform various functions such as transporting plates of glass, sheets of material, boxes, cartons and other loads in warehouses; also, they may serve as a platform to allow working at certain heights. Examples of such hand trucks may be found described in U.S. Pat. No. 2,833,550 issued May 6, 1958 to Frick, U.S. Pat. No. 3,003,788 issued Oct. 10, 1961 to Grymer, and U.S. Pat. No. 3,762,739 issued Oct. 2, 1973 to Tabet. The trucks defined in these patents include dismountable parts; however, none is capable of performing all the various tasks just mentioned while, at the same time, being capable of compactly storing those components which are not used when a particular function or work is performed.

OBJECTS AND STATEMENT OF THE INVENTION

It is an object of the present invention to provide a hand truck which can easily be converted into one of the above-mentioned trucks while at the same time being capable of storing unused components when the truck is so arranged as to perform one particular function.

It is a further object of the present invention to provide a hand truck of the class described which is simple in construction and, therefore, comparatively cheap to manufacture.

Another object of the present invention is to provide a hand truck of the class described which is effective and which is constructed in a manner that it can be quickly and easily mounted and dismounted to perform various tasks.

The present invention therefore relates to a hand truck which comprises, in combination:

a substantially rectangular base frame defined by a pair of longitudinal side members and front and rear end members, the members being fixed in a horizontal plane;

a handle adapted for connection to the front end member;

four uprights each adapted for mounting in an opening provided at each corner of the base frame;

a pair of support elements adapted for mounting to the uprights vertically above the side members;

platform means adapted for support on the support elements;

supporting mounts secured to the front and rear end members for receiving two of the uprights in an inclined plane relative to the plane of the base frame; and means for compactingly storing in the base frame the handle, the uprights, the support elements and the platform means.

In a preferred embodiment of the invention, the hand truck further comprises rod means which are adapted for connection to the uprights and are spaced vertically above the front and rear end members; these rod means are mountable to the uprights when located at each corner of the base frame and are stored underneath the base frame with the platform means.

The scope of applicability of the present invention will become apparent from the detailed description given hereinafter; it should be understood, however, that this description, while indicating preferred embodiments of the invention, is given by way of illustration only, since various changes and modifications within the spirit and scope of the invention will become apparent to those skilled in the art.

IN THE DRAWINGS

FIG. 1 is a perspective view of the hand truck made in accordance with the present invention with some components being compactly stored;

FIG. 2 is an exploded view showing the various components of the hand truck of the present invention;

FIG. 3 is a top view of the base frame showing all components in stored position;

FIG. 4 is a top view showing the bed plates and the rods in stored position;

FIG. 6 is a perspective view showing the hand truck in a panel-supporting inclined position.

DESCRIPTION OF PREFERRED EMBODIMENTS

Figure 5:
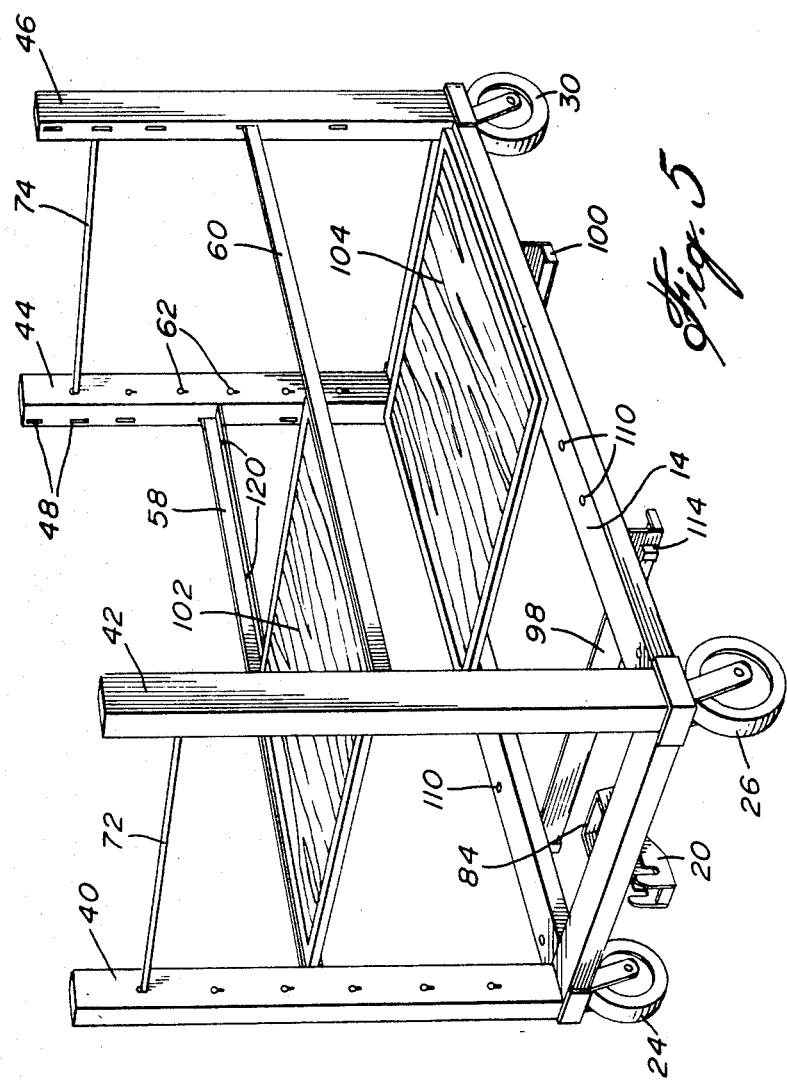
FIG. 5 is a perspective view showing the hand truck in a platform-supporting arrangement.

Referring to FIGS. 1-4, there is shown a hand truck 10 consisting of a substantially rectangular base frame defined by a pair of longitudinal side members 12 and 14 and a front end member 16 and a rear end member 18, all members being fixed in a horizontal plane. The front end member 16 has an attachment bracket 20 and adapted for connecting a handle 22 to pull the hand truck. The base frame includes, at each corner, a lockable swivel caster 24, 26, 28 and 30 so arranged as to allow displacement of the hand truck in any direction. Each corner of the base frame is provided with a tubular rectangular opening 32, 34, 36, 38 which is adapted to receive the lower extremity of a correspondingly shaped upright 40, 42, 44, 46; each of these uprights (see upright 44 in FIG. 2) comprises, on its shorter side, a series of rectangular-shaped vertically-spaced slots which are adapted to receive therein the correspondingly shaped extremities 50, 52, 54, 56 of two L-shaped support elements 58 and 60. These extremities are inserted in the slots 48 and have recessed portions 61 which find support on the lower edge of each slot. The wider side of the uprights includes a series of openings 62 which are adapted to receive the extremities 64 and 66, 68 and 70 of two rods 72 and 74. In addition to interconnect two uprights, these rods may serve to support tools and other instruments used in the performing of certain tasks, especially when the hand truck is in a platform supporting arrangement.

The inner sidewalls 76 and 78 of end members 16 and 18 display a narrow supporting plate 80 and 82 which is fixed to their underside. Referring to FIG. 3, these plates 80 and 82 serve to support the uprights 40, 42, 44 and 46 when stored in a horizontal position in the base frame as well as the two supporting elements 58 and 60 which are nested one on top of the other and have their extremities received in a slot in each side wall 76, 78, one slot being shown at 116.

A pair of supporting mounts 84 and 86 are also mounted to the inner sidewall of the front and rear end members and to their corresponding plates 80 and 82.

These mounts have a rectangular shape but extend in an inclined plane with respect to the plane of plates 80 and 82 or the horizontal plane of the base frame. Referring to FIG. 4, the supporting mount 84 includes an inwardly projecting pin 88 which is adapted to be received within the hollow tubular extremity 90 of the handle 22. The supporting mount 86 includes two L-shaped fingers 92 and 94 for receiving the opposite T-shaped extremity 96 of the handle.

Attached to the underside of the side members 12 and 14 are two L-shaped support members 98 and 100, facing one another and having one opened end to slidably receive a pair of bed plates 102 and 104 so that they can be stored underneath the base frame when not required. These bed plates may consist of wooden boards with reinforced metallic edges, the latter including a series of pins 106 and openings 108 so disposed that two bed plates may abut one another in a face-to-face arrangement when stored underneath the base frame. The pins 106 may also engage a series of openings 110 provided in the side members 12 and 14 so that the bed plates may be held fixed when in the position shown in FIG. 1. The outer sidewall of at least one transverse member (see member 98) includes a pair of fingers 112 and 114 in which are stored the pair of rods 72 and 74.

In FIG. 5, the support elements 58 and 60 are shown mounted to the uprights 40, 44 and 42, 46 respectively. One of the bed plate 102 is supported on these supporting elements while the other bed plate 104 rests on the base frame. However, plate 104 may also be supported next to bed plate 102 on supporting elements 58 and 60 to provide a full platform. A series of openings 120 are provided on each supporting element 58, 60 so that pins 106 on the bed plates may be received therein.

Referring to FIG. 6, the hand truck is arranged so that a panel, shown in dotted lines as 122 (for example a plate glass, or a sheet of material), may be carried in an inclined position. Two uprights 40 and 42 are located in the supporting mounts 84 and 86 which cause the two uprights to adapt an inclination relative to the base frame. It can be seen that, in this arrangement, all the various components are stored in the hand truck and do not hinder the function for which the hand truck is arranged in this case.

Although the invention has been described in connection with some specific forms, it will be evident to the person skilled in the art that it may be refined and modified in various ways. It is therefore wished to have it understood that the present invention should not be limited in interpretation except by the terms of the following claims.

The embodiments of the invention in which an exclusive property or privilege is claimed are defined as follows:

1. A hand truck comprising, in combination:

(a) a substantially rectangular base frame defined by a pair of longitudinal side members and front and rear end members, said members being fixed in a horizontal plane;
   (b) a handle adapted for connection to said front end member;
   (c) four uprights each adapted for mounting in an opening provided at each corner of said base frame;
   (d) a pair of support elements adapted for mounting to said uprights vertically above said side members;
   (e) platform means adapted for support on said support elements;
   (f) supporting mounts secured to said front and rear end members for receiving two of said uprights in an inclined plane relative to the plane of said base frame; and
   (g) means for compactly storing in said base frame said handle, said uprights, said support elements and said platform means comprising a pair of parallel facing L-shaped cross-members secured to the underside of said side members and slidably receiving said platform means sideways therein.

2. A hand truck as defined in claim 1, wherein said storing means for said uprights and said support elements consist of a pair of cross-members secured to said frame adjacent said front and rear end members.

3. A hand truck as defined in claim 2, wherein said storing means for said support elements further include slot means in said end members for receiving therein the extremities of said support members.

4. A hand truck as defined in claim 1, 2 or 3, wherein said storing means for said handle consist of engagement means on said supporting mounts for receiving opposite extremities of said handle.

5. A hand truck as defined in claim 1, 2 or 3, comprising attachment means on said front end member for removably connecting said handle thereto.

6. A hand truck as defined in claim 1, wherein said uprights include a series of vertically spaced slots to receive opposite extremities of said support elements when said uprights are mounted at the corners of said base frame.

7. A hand truck as defined in claims 1 or 6, further comprising rod means adapted for connection to said uprights and spaced vertically from said front and rear end members; said rod means being storable in supports mounted to at least one of said L-shaped cross-members.

8. A hand truck as defined in claim 1, wherein said platform means consist of a pair of bed plates with edges adapted to sit in said support elements; said bed plates being adapted to be fixed to said side members and said front and rear end members when said handle, uprights and support elements are stored in said base frame.

9. A hand truck as defined in claim 1, 2 or 3, comprising a swivel caster at each corner of said base frame.

* * * * *